United States Patent
Mohammed et al.

(10) Patent No.: US 7,928,860 B2
(45) Date of Patent: *Apr. 19, 2011

(54) SYSTEM AND METHOD FOR IMPORTING LOCATION INFORMATION AND POLICIES AS PART OF A RICH PRESENCE ENVIRONMENT

(75) Inventors: Aziz Mohammed, Plano, TX (US); Fuming Wu, Frisco, TX (US)

(73) Assignee: Alcatel Lucent, Paris (FR)

(*) Notice: Subject to any disclaimer, the term of this patent is extended or adjusted under 35 U.S.C. 154(b) by 1261 days.

This patent is subject to a terminal disclaimer.

(21) Appl. No.: 11/470,045

(22) Filed: Sep. 5, 2006

(65) Prior Publication Data
US 2007/0024453 A1    Feb. 1, 2007

Related U.S. Application Data

(63) Continuation of application No. 10/862,765, filed on Jun. 5, 2004, now Pat. No. 7,154,409.

(51) Int. Cl.
*G08B 5/22* (2006.01)
*G08B 1/08* (2006.01)
*G08B 13/14* (2006.01)

(52) U.S. Cl. ......... 340/825.49; 340/539.13; 340/539.18; 340/539.19; 340/572.1

(58) Field of Classification Search .............. 340/825.49, 340/825.36
See application file for complete search history.

(56) References Cited

U.S. PATENT DOCUMENTS

| | | | | |
|---|---|---|---|---|
| 6,853,294 B1 * | 2/2005 | Ramamurthy et al. | ...... | 340/10.1 |
| 6,900,731 B2 * | 5/2005 | Kreiner et al. | ............. | 340/572.1 |
| 7,154,409 B2 * | 12/2006 | Mohammed et al. | .... | 340/825.49 |
| 2005/0099268 A1 * | 5/2005 | Juels et al. | ................... | 340/10.4 |

* cited by examiner

*Primary Examiner* — Donnie L Crosland
(74) *Attorney, Agent, or Firm* — Capitol Patent & Trademark Law Firm, PLLC

(57) ABSTRACT

A system and method are described herein that includes a presence server which is capable of notifying a watcher about a location of a person using a rich presence element in accordance with security and privacy rules specified by the person. In the preferred embodiment, the system uses a read/write RFID tag and RFID reader as well as a presence server to collect, store and distribute location information as a presence element to the watcher. To accomplish this, the user data and program carrying capability of the read/write RFID tag is used to push to the presence server not only location information but also policies and rules established by the user to control the distribution of the location information as a presence element to watchers. The location policy rules can be made and controlled by the user and/or a third party. The location policies and rules are separate from the traditional and less stringent presence policies and rules used by the presence server to control the distribution other types of presence information like information about the status of a person's communication devices to the watchers.

18 Claims, 3 Drawing Sheets

US 7,928,860 B2

SYSTEM AND METHOD FOR IMPORTING LOCATION INFORMATION AND POLICIES AS PART OF A RICH PRESENCE ENVIRONMENT

CROSS-REFERENCE TO RELATED APPLICATIONS

This application is a continuation of U.S. application Ser. No. 10/862,765 filed on Jun. 5, 2004 entitled "System and Method for Importing Location Information and Policies as Part of a Rich Presence Environment", now issued as U.S. Pat. No. 7,154,409.

BACKGROUND OF THE INVENTION

1. Field of the Invention

The present invention relates in general to a system and method that includes a presence server capable of notifying a watcher (e.g., team leader) about a location of a person (e.g., team member) using a rich presence element in accordance with security and privacy rules specified by the person.

2. Description of Related Art

As shown in FIG. 1, an existing presence server 100 is shown which is coupled to a user agent 102 sends rich presence information 104 to a watcher 106 (e.g., team leader 106) so as to notify the watcher 106 for example about the status of communication devices like a phone and/or a computer used by a person 108 (e.g., team member 108). In this way, the watcher 106 can tell if the person 108 is currently working on their computer or talking on their phone before trying to contact that person 108. However, the presence server 100 does not send information about the current location of the person 108 to the watcher 106. Instead, a location server 110 is needed to send location information 112 about the person 108 to the watcher 106. In a typical network, the location server 110 obtains location information 112 from a RFID reader 114 (only one shown) that is located in a particular area of an office building/work environment/hospital (for example) which receives a unique identifier 116 from an RFID tag 118 carried by the person 108. The RFID reader 114 can use IEEE802.11 (or similar standard) to establish wireless communications with the RFID tag 118 and then read the unique identifier 116 which enables the determination of the current position 112 of the person 108 within the office building/work environment/hospital (for example). The RFID reader 114 sends this information via a local area network (LAN) 120 for example to the location server 110 which organizes and stores the location information 112 in database 122 so it can be reported to the watcher 102.

It would be desirable if there was a way of eliminating the need to use the location server 110 and instead enable the presence server 100 to receive and organize the location information 112 in a database 123 so it can be sent as a rich presence element along with the other presence elements 104 to the watcher 106. This was not possible in the past because the location server 110 has a location manager 124 with a location rule holder 126 that contains requirements/rules for security and privacy which indicates whether or not the location information 112 should be sent to the watcher 106 in the first place that are much more stringent than the requirements/rules stored in a general presence rule holder 128 of a preference manager 130 used by the presence server 100 to determine whether or not to send rich presence elements 104 to the watcher 106. This problem is solved by the present invention.

BRIEF DESCRIPTION OF THE INVENTION

The present invention includes a system and method that includes a presence server capable of notifying a watcher about a location of a person using a rich presence element in accordance with security and privacy rules specified by the person. In the preferred embodiment, the system uses a read/write RFID tag and RFID reader as well as a presence server to collect, store and distribute location information as a presence element to the watcher. To accomplish this, the user data and program carrying capability of the read/write RFID tag is used to push to the presence server not only location information but also policies and rules established by the user to control the distribution of the location information as a presence element to watchers. The location policy rules can be made and controlled by the user and/or a third party. The location policies and rules are separate from the traditional and less stringent presence policies and rules used by the presence server to control the distribution of other types of presence information like information about the status of a person's communication devices to the watchers.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
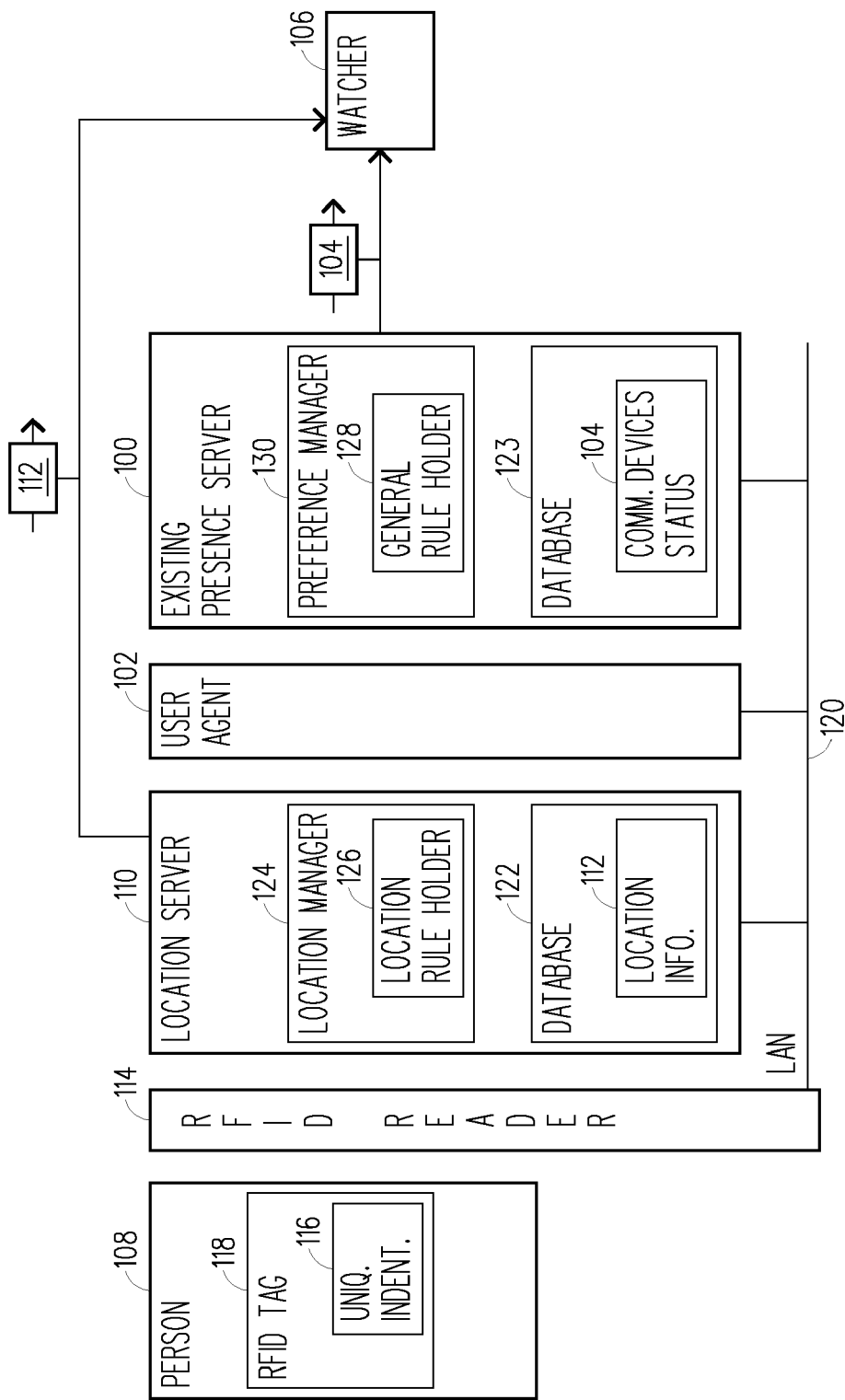
FIG. 1 (PRIOR ART) is a diagram of a traditional system that uses a presence server and a location server to respectively send presence information (e.g., status of communication devices) and location information about a person (e.g., team member) to a watcher (e.g., team leader)
Figure 2:
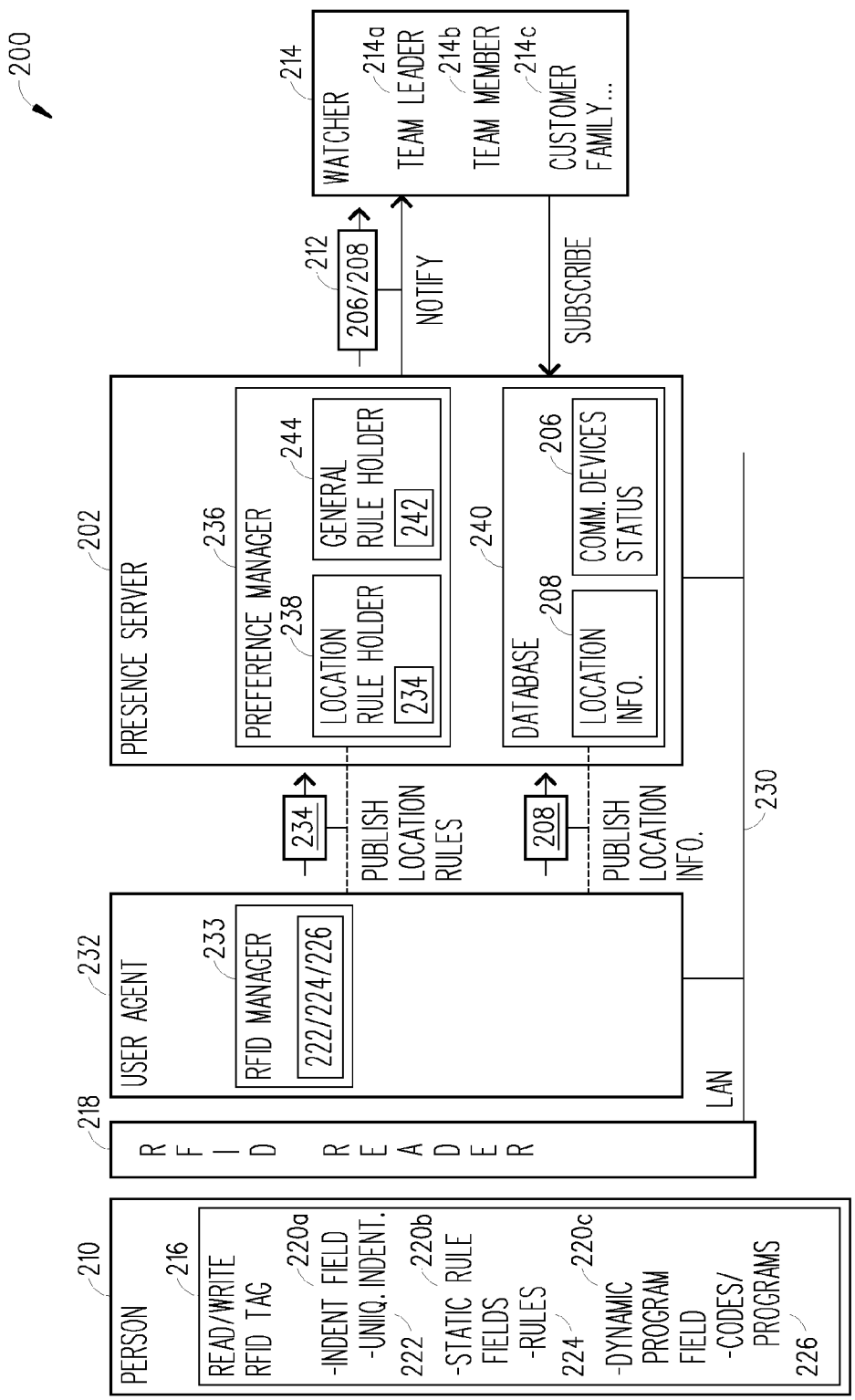
FIG. 2 is a diagram of a system that uses a presence server to send a presence element including presence information (e.g., status of communication devices) and location information about a person (e.g., team member) to a watcher (e.g., team leader)

Referring to FIG. 2, there is a diagram of a system 200 having a presence server 202 which can send a presence element 212 that includes presence information 206 (e.g., status of communication devices) and/or location presence information 208 about a person 210 (e.g., team member 210) to a watcher 214 (e.g., team leader 214, fellow team member 214). In the preferred embodiment, the person 210 (only one shown) carries a read/write RFID tag 216 around with them in an office building/work environment/hospital (for example) in which there is distributed a number of RFID readers 218 (only one shown). The read/write RFID tag 216 is a dynamic data/program carrier which means the person 210 or company personnel etc. . . can add or change the data or programs stored in the RFID tag 216.

The read/write RFID tag 216 in the preferred embodiment has several fields including: (1) an identifier field 220a; (2) a rule field 220b; and (3) a program field 220c. The identifier field 220a stores a unique personal identifier 222 and other information that are read by the RFID reader 218. The rule field 220b is a static field that stores rules 224 related to the handling or distribution of location information 208 to the watchers 214. For instance, a static rule 224 can be set such that no watchers 214 are to be notified about the location of the person 210 if he/she is location in a restroom. And, the program field 220c is a dynamic field that stores various codes/programs 226 related to the handling or distribution of the location information 208 to the watchers 214. For instance, the program field 220c can store programs 226 that are executed only if read by a particular RFID reader 218 or read by certain ones of the RFID readers 210. Each program 226 contains rules on which if any watchers 214 should be notified about the location of the person 210 depending on certain conditions like the day, time and position of person 210 within the building . . . when the read/write RFID tag 216 is read by one of the RFID readers 218. In one example, the person 210 may input a program 226 that has the conditions where only watchers 214 that happen to be a team leader 214a or team members 214b can be notified as to their location at any time and any day if they are located in their office or a laboratory. However, the person 218 can also set the program 226 so it has conditions where a watcher 214 that happens to be a customer 214c will only be notified during normal business hours if they happen to be located in their office. Of course, there are many different programs 226 that cover different situations which can be stored in the program field 226 that are created by the person 210 and/or third parties such as the boss of the person 210.

The RFID reader 218 can use IEEE802.11 (or similar standard) to establish wireless communications with the RFID tag 216. The RFID reader 218 then reads the tag information including the unique personal identifier 222 and the policy preferences 224 and 226. The RFID reader 218 sends this unprocessed information 222, 224 and 226 via a LAN 230 or other network like the Internet to a user agent 232. It should be noted that one company for example can have many RFID readers 218 located in many different buildings located around the world that all send unprocessed information 222, 224 and 226 from RFID tags 216 carried by people 210 to a centrally located user agent 232. This way the watchers 214 can be notified about the location of people 210 in many different buildings located around the world.

The user agent 232 includes a RFID system network manager 233 that processes the information 222, 224 and 226 and generates the location information 208 and the policy preferences 234 which relates to the distribution of the location information 208 to the watchers 214. The user agent 232 sends the processed location information 208 and the processed policy preferences 234 to the presence server 202. Alternatively, the RFID system network manager 233 can be located remote from the user agent 232.

The presence server 202 includes a preference manager 236 that stores the policy preferences 234 in a private location rule holder 238. The presence server 202 also includes a database 240 that stores the location information 208. In addition, the presence server 202 receives other presence information 206 about the person 210 like whether or not their communication devices such as a phone and a computer are currently being used. This presence information 206 is stored in the database 240 and various policies and rules 242 associated with the distribution of this information 206 to the watchers 214 is stored in a general presence rule holder 244 of the preference manager 236. Typically, the policy preferences 234 stored in the private location rule holder 238 are more stringent than the policies and rules 242 stored in the general presence rule holder 244. In other words, the watcher 214 is more likely to be sent presence information 206 than being sent the location information 208.

The presence server 202 sends the presence element 212 which includes the presence information 206 and/or the location information 208 about the person 210 (e.g., team member 210) to the watchers 214 in accordance with the policy preferences 234 and 242. To receive the presence element 212, each watcher 214 needs to subscribe with the presence server 202 indicating that they want to obtain the location presence information 208 and the other presence information 206 from one or more persons 210. Again, it is possible that one watcher 214a (team leader 214a) can receive a presence element 212 that contains both the presence information 206 (status of the communication devices used by the person 210) and the location information 208. And, it is also possible that another watcher 214c (customer 214c) can receive a presence element 212 that contains the presence information 206 (status of the communication devices used by the person 210) but not the location information 208. Essentially, the presence server 202 notifies each of the watchers 214 about the presence information 206 and the location information 208 based on the policy preferences 234 and 242 stored in the preference manager 236.

Figure 3:
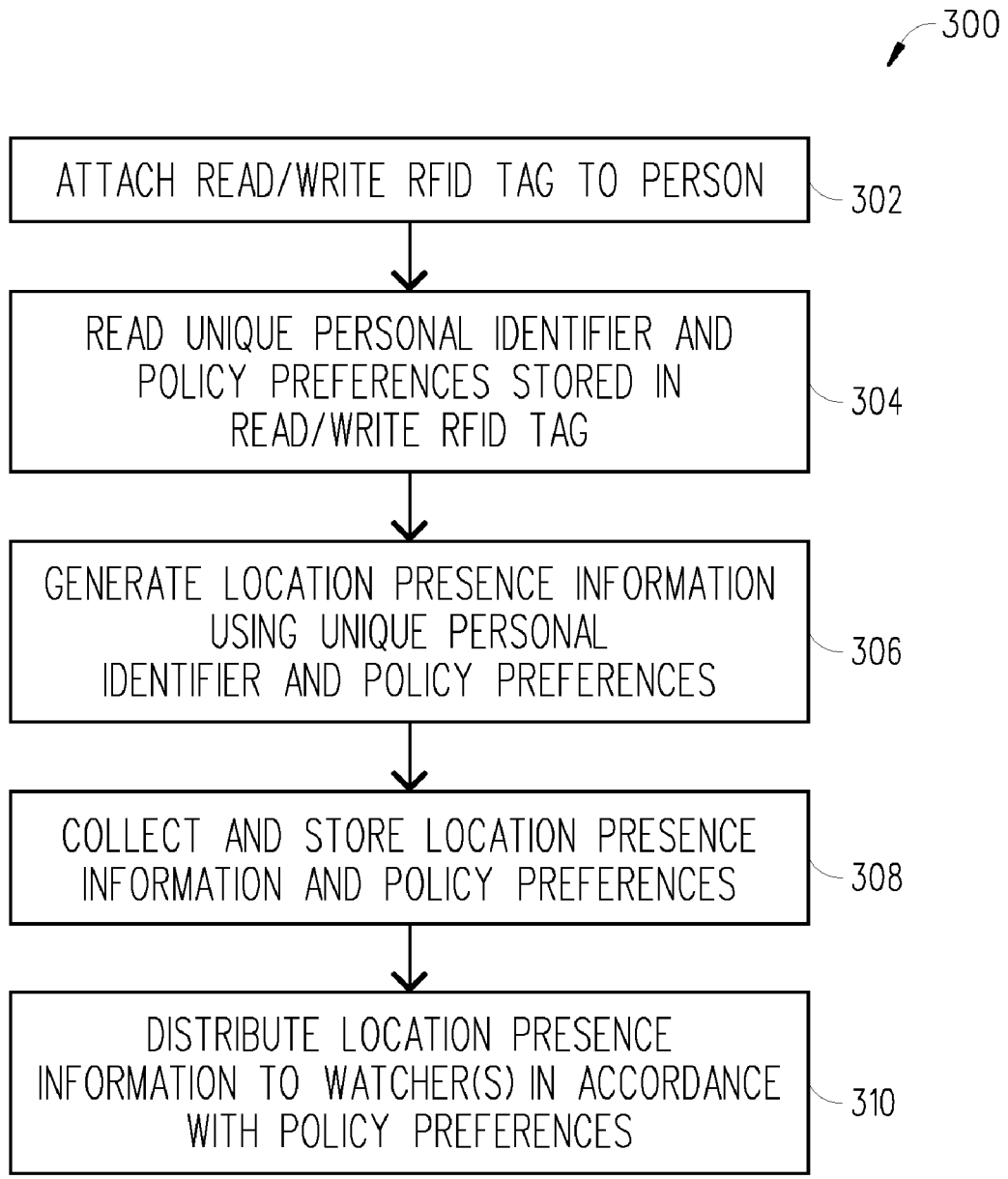
FIG. 3 is a flowchart of the basic steps of a preferred method for communicating a presence element including presence information (e.g., status of communication devices) and location information about a person (e.g., team member) to a watcher (e.g., team leader) in accordance with the present invention.

Referring to FIG. 3, there is a flowchart of the basic steps of the preferred method 300 for communicating location presence information 208 to a watcher 214 in accordance with the present invention. Beginning at step 302, the person 210 carries the read/write RFID tag 216 around with them in an office building/work environment/hospital (for example) in which there is distributed one or more RFID readers 218. Prior to carrying the RFID tag 216, the person 210 and/or a third party programs the read/write RFID tag 216 to store policy information 224 and 226 on how and if location information 208 about the person 210 is to be distributed to the watchers 214.

At step 304, one or more of the RFID readers 218 communicates with and reads the unique personal identifier 222 and the policy preferences 224 and 226 stored in the read/write RFID tag 216 as the person 210 moves within a building. In one embodiment, the RFID reader 218 can use IEEE802.11 (or similar standard) to establish wireless communications with the RFID tag 216. The RFID reader 218 sends the unprocessed information 222, 224 and 226 via the LAN 230 or other network like the Internet to the user agent 232.

At step 306, the user agent 232 which includes the RFID system network manager 233 processes the information 222, 224 and 226 and generates the location presence information 208 and policy preferences 234.

At step 308, the user agent 232 sends the processed location information 208 and the processed policy preferences 234 to the presence server 202. The preference manager 236 stores the policy preferences 234 in a private location rule holder 238. And, the database 240 stores the location information 208. The presence server 202 also receives other presence information 206 about the person 210 like whether or not their communication devices such as a phone and/or a computer are currently being used. This presence information 206 is stored in the database 240 and the various policies and rules 242 associated with the distribution of this information 206 is stored in a general presence rule holder 244 of the preference manager 236.

At step 310, the presence server 202 distributes the presence element 212 which includes the presence information 206 and/or the location presence information 208 about the person 210 to the watchers 214 in accordance with the policy preferences 234 and 242. In order to receive the presence element 212, each watcher 214 needs to first subscribe with the presence server 202 indicating that they want to obtain the location presence information 208 and the other presence information 206 from one or more persons 210. Again, it is possible that one watcher 214 (e.g., team leader 214a) can receive a presence element 212 that contains both the presence information 206 (status of the communication devices used by the person 210) and the location information 208. And, another watcher 214 (e.g., customer 214c) can receive a presence element 212 that contains only the presence information 206 (status of the communication devices used by the person 210) and not the location information 208.

As described above, the presence server 202 can obtain and distribute location information 208 as part of rich presence element 212 based on security and privacy rules 234 specified by users 210. The delivery of accurate location information 208 as part of a principal's rich presence environment can in one application for example enhance the communication among co-operating team members. For instance, project members in an enterprise and health care workers in a hospital can facilitate their face-to-face communication, instant conferencing and message relaying capabilities through the knowledge of the whereabouts of fellow team members. As proposed herein, the team members 214 carry RFID tags 216 and RFID readers 218 are installed in selected areas of the work place in order to obtain the location information 208, policy preference 234 and identity of team members 210. This information is passed to the user agent 232 of the principal through the office LAN 230 or other network to be published as part of his/her presence in the presence server 202. The presence server 202 distributes the location information 208 to team members 214 in accordance with the policy preferences 234. An exemplary operation could be implemented as follows:

- The RFID reader 218 in the room where the person 210 (principal 210) is currently located reads the unique identifier 222 of the person 210. Additional data and programs 224 and 226 are also read for later management use in the presence server 202.
- This information 222, 224 and 226 is passed to the user agent 232. The user agent 232 processes this information 222, 224 and 226 and pushes the location information 208 and policy preferences 234 to the presence server 202.
- The presence server 202 distributes the changing location information 208 in accordance with the preference rules 234 of the person 210 to his/her team members 214 who have subscribed to be his/her presence watchers.

It should also be noted that the read/write RFID tag 216 can also incorporate a global positioning system (GPS) unit (not shown). In this way, a third party can track the location of the person 210 who happens to be carrying the read/write RFID tag 216 when they are outside of the range of the RFID readers 218. This location information can be sent to the presence server 202 and distributed to the watchers 214 in accordance with the policy preferences 234.

From the foregoing, it should be readily appreciated by those skilled in the art that the system 200 and method 300 of the present invention includes a presence server 202 capable of notifying a watcher 214 about a location 208 of a person 210 using a rich presence element 212 in accordance with security and privacy rules 234 specified by the person 210. In the preferred embodiment, the system 200 uses a read/write RFID tag 216 and RFID reader 218 as well as a presence server 202 to collect, store and distribute location information 208 as a presence element 212 to the watcher 214. To accomplish this, the user data and program carrying capability of the read/write RFID tag 216 is used to push to the presence server 202 not only location information 208 but also policies and rules 234 established by the user 210 to control the distribution of the location information 208 as a presence element 212 to watchers 214. The location policy rules 234 can be made and controlled by the user 210 and/or a third party. The location policies and rules 234 are separate from the traditional and less stringent presence policies and rules 242 used by the presence server 202 to control the distribution of other types of presence information 206 like information about the status of a person's communication devices to the watchers 214.

It should be appreciated that this joint pushing of location information 208 and rules 234 to the presence server 202 has several advantages some of which are described below:

- Enable the use of location information in a rich presence environment without a need to develop the location service infrastructure.
- Enables the creation of dynamic policies using the programmability of read/write RFID tags.
- Enables the creation of location information 208 that has a short life for privacy. In other words, the watcher 214 is sent only current location information 208.
- Enables the generation of pseudonyms on demand, if required for privacy and security.

Although one embodiment of the present invention has been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

What is claimed is:

1. A network for communicating location presence information to watchers, the network comprising:
    a plurality of programmable tags associated with a plurality of persons, each of the programmable tags stores a unique personal identifier and policy preferences on distribution of the location presence information, wherein each programmable tag is adapted to enable a person associated therewith to modify policy preferences;
    a location system for communicating with one or more of the programmable tags and
    determining location and associating therewith the stored unique personal identifiers and the stored policy preferences;
    a user agent for generating the location presence information by processing the unique personal identifiers and the policy preferences received from the location system; and
    a presence server for collecting the location presence information from the user agent and for distributing the location presence information to the watchers in accordance with the policy preferences.

2. The network of claim 1, wherein the presence server further includes:
    a preference manager that includes:
    a private location rules holder for storing the policy preferences; and
    a general presence rule holder for storing policy preferences associated with the distribution of other presence information; and
    a database for storing the location presence information and the other presence information.

3. The network of claim 1, wherein each of the programmable tags includes:
    an identifier field;
    a static rule field; and
    a dynamic program field.

4. The network of claim 1, wherein each watcher subscribes to the presence server to obtain the location presence information from one or more of the persons.

5. The network of claim 1, wherein the user agent and the presence server communicate with one another over a Local Area Network (LAN).

6. The network of claim 1, wherein the policy preferences include rules on which if any watchers should be notified about the determined location.

7. The network of claim 1, wherein the location system includes a global positioning system (GPS).

8. A method for communicating location presence information to watchers, the method comprising the steps of:
- associating a positioning tag to a person where the positioning tag stores a unique personal identifier and policy preferences on distribution of the location presence information, wherein the positioning tag is programmable by the person for modifying the policy preferences;
- communicating with the positioning tag for locating and associating therewith the unique personal identifier and the policy preferences stored in the positioning tag;
- generating the location presence information by processing the unique personal identifier and the policy preferences; and
- distributing the location presence information to the watchers in accordance with the policy preferences.

9. The method of claim 8, further comprising the steps of collecting other presence information about the person for distributing the other presence information to the watchers.

10. The method of claim 8, wherein a presence server collects the location presence information for distribution in accordance with the policy preferences.

11. The method of claim 10, wherein the presence server includes:
- a preference manager that includes:
- a private location rules holder for storing the policy preferences; and
- a general presence rule holder for storing policy preferences associated with the distribution of the other presence information; and
- a database for storing the location presence information and the other presence information.

12. The method of claim 10, wherein each watcher subscribes with the presence server to obtain the location presence information.

13. The method of claim 8, wherein the positioning tag includes programmable memory having:
- an identifier field;
- a static rule field; and
- a dynamic program field.

14. The method of claim 8, wherein the positioning tag includes a global positioning system (GPS) unit.

15. A network for communicating location presence information to watchers, the network comprising:
- a plurality of positioning tags placed for defining an area, each of the positioning tags having readable information for determining geographical location of the positioning tag;
- a reader for communicating with one or more of the positioning tags and ascertaining the geographical location indicating information, wherein the reader includes programmable memory for maintaining a unique personal identifier and policy preferences on distribution of the location presence information which is determined at least in part from the ascertained geographical location indicating information;
- the reader memory is adapted to enable a user to modify the policy preferences;
- a user agent in communication with the reader for generating the location presence information by processing the unique personal identifiers and the policy preferences received from the reader; and
- a presence server for collecting the location presence information from the user agent and for distributing the location presence information to the watchers in accordance with the policy preferences.

16. The network of claim 15, wherein the presence server further includes:
- a preference manager that includes:
- a private location rules holder for storing the policy preferences; and
- a general presence rule holder for storing policy preferences associated with the distribution of other presence information; and
- a database for storing the location presence information and the other presence information.

17. The network of claim 15, wherein the reader includes:
- an identifier field;
- a static rule field; and
- a dynamic program field.

18. The network of claim 15, wherein the user agent and the presence server communicate with one another over a Local Area Network (LAN).

\* \* \* \* \*